(12) United States Patent
Wang et al.

(10) Patent No.: US 12,420,870 B2
(45) Date of Patent: Sep. 23, 2025

(54) VIBRATION DAMPING DEVICE FOR VEHICLE

(71) Applicant: HONDA MOTOR CO., LTD., Tokyo (JP)

(72) Inventors: Xun Wang, Saitama (JP); Toshio Inoue, Saitama (JP); Yuho Ito, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 433 days.

(21) Appl. No.: 18/176,720

(22) Filed: Mar. 1, 2023

(65) Prior Publication Data

US 2023/0347984 A1   Nov. 2, 2023

(30) Foreign Application Priority Data

Mar. 30, 2022   (JP) .................................. 2022-055859

(51) Int. Cl.
| | |
|---|---|
| *B62D 1/11* | (2006.01) |
| *B62D 21/11* | (2006.01) |
| *B62D 24/02* | (2006.01) |
| *B62D 24/04* | (2006.01) |
| *F16F 15/00* | (2006.01) |

(52) U.S. Cl.
CPC .............. *B62D 24/04* (2013.01); *B62D 21/11* (2013.01); *F16F 15/002* (2013.01); *F16F 2222/06* (2013.01); *F16F 2228/066* (2013.01); *F16F 2230/18* (2013.01)

(58) Field of Classification Search
CPC ........... B62D 21/11; B62D 24/02; F16F 1/361
See application file for complete search history.

(56) References Cited

U.S. PATENT DOCUMENTS

| | | | | |
|---|---|---|---|---|
| 9,623,909 | B1 * | 4/2017 | Hirano ................... | B62D 21/11 |
| 10,844,923 | B2 * | 11/2020 | Inoue ...................... | F16F 1/361 |
| 2006/0049603 | A1 * | 3/2006 | Katagiri ................. | B62D 21/11 |
| | | | | 280/124.109 |
| 2009/0091093 | A1 * | 4/2009 | Urababa ............ | B60G 21/0555 |
| | | | | 280/5.511 |
| 2009/0224493 | A1 * | 9/2009 | Buma ................ | B60G 17/0162 |
| | | | | 280/5.511 |
| 2009/0273147 | A1 * | 11/2009 | Inoue ...................... | F16F 15/03 |
| | | | | 280/5.505 |
| 2010/0138108 | A1 * | 6/2010 | Kajino ................. | B60G 17/016 |
| | | | | 701/38 |

(Continued)

FOREIGN PATENT DOCUMENTS

JP              6576412 B2      9/2019

*Primary Examiner* — Long T Tran
(74) *Attorney, Agent, or Firm* — Armstrong Teasdale LLP

(57) ABSTRACT

A vibration damping device for a vehicle includes a subframe to which a vibration of a wheel is transmitted, a plurality of mounts arranged between the subframe and a vehicle body and configured such that stiffness of each mount in a prescribed direction changes according to an excitation current supplied thereto, and a controller configured to control the excitation current supplied to each mount, wherein the controller is configured to set a target elastic center of the subframe, and individually calculate the excitation current supplied to each mount so as to match an actual elastic center of the subframe with the target elastic center.

6 Claims, 9 Drawing Sheets

(56) References Cited

U.S. PATENT DOCUMENTS

| | | | |
|---|---|---|---|
| 2012/0326368 A1* | 12/2012 | Makino | F16F 1/3863 |
| | | | 29/436 |
| 2015/0290995 A1* | 10/2015 | Kanda | B60G 17/0182 |
| | | | 701/37 |
| 2016/0347144 A1* | 12/2016 | Suissa | B60G 15/06 |
| 2017/0120710 A1* | 5/2017 | Yoshimi | B60G 17/018 |
| 2019/0154098 A1* | 5/2019 | Inoue | F16F 1/361 |
| 2019/0170206 A1* | 6/2019 | Inoue | F16F 9/535 |

* cited by examiner

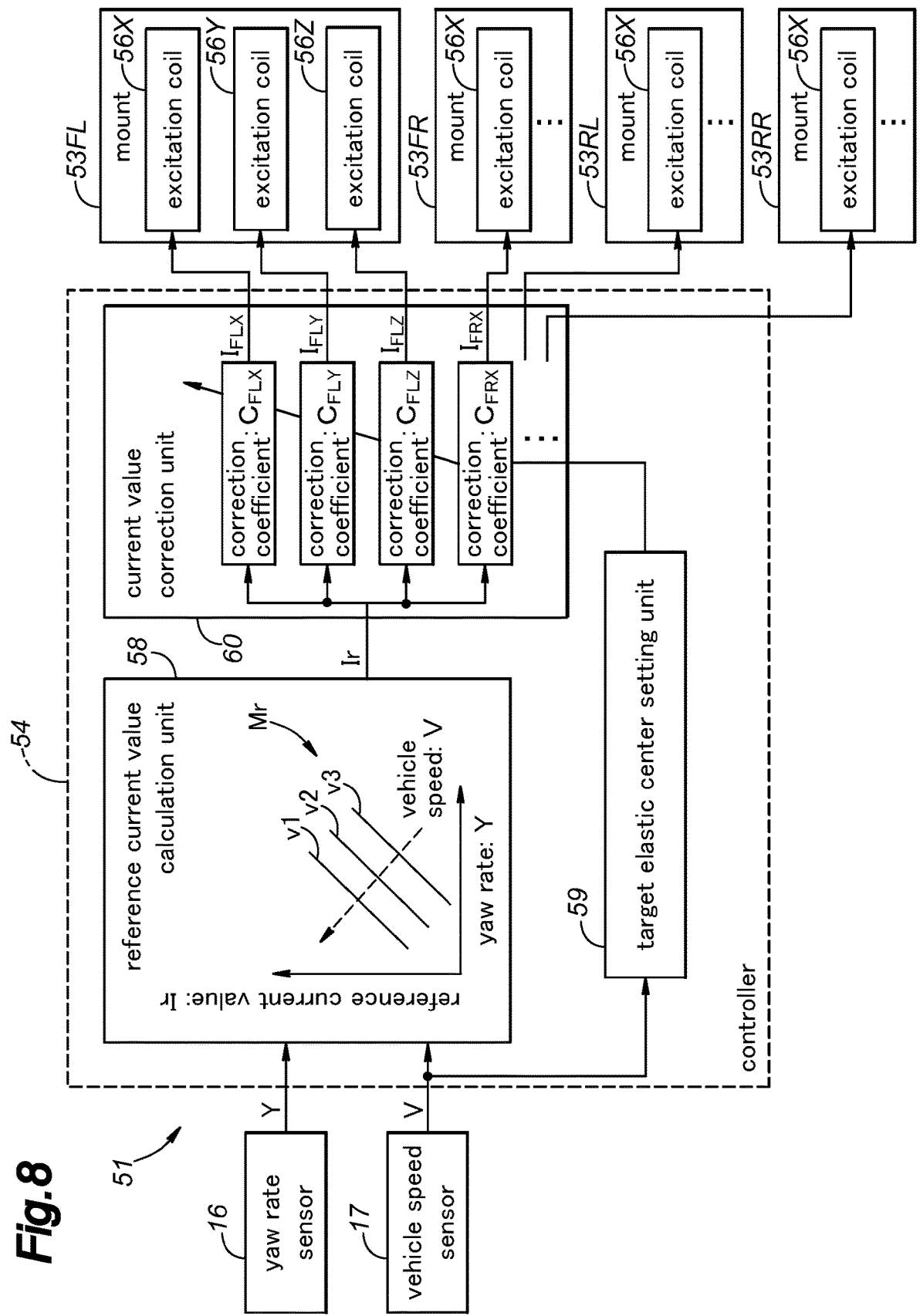

VIBRATION DAMPING DEVICE FOR VEHICLE

TECHNICAL FIELD

The present invention relates to a vibration damping device for a vehicle.

BACKGROUND ART

In recent years, in consideration of vulnerable people such as elderly people and children among traffic participants, active efforts have been made to provide these people with access to sustainable transport systems. In order to achieve such a goal, close attention is paid to the research and development for further improving the safety and convenience of traffic through the development of the inhabitability of a vehicle.

In order to improve the inhabitability of the vehicle, it is preferable to enhance the vibration damping performance in a vehicle cabin. Conventionally, the research and development of a vibration damping device for a vehicle have been actively carried out. For example, Japanese Patent No. 6576412 discloses a vehicle including a subframe, a plurality of mounts arranged between the subframe and a vehicle body and configured such that the stiffness of each mount changes according to an excitation current supplied thereto, and an ECU configured to supply the excitation current to each mount.

However, in the above conventional technique, the ECU is configured to supply the excitation current of the same value to the plurality of mounts. Accordingly, if the ECU supplies the excitation current to each mount when the vehicle turns, the stiffness of the plurality of mounts increases simultaneously and uniformly, which may cause the vibration of the subframe to be easily transmitted to the vehicle body via the plurality of mounts.

SUMMARY OF THE INVENTION

In view of the above background, an object of the present invention is to enhance the vibration damping performance inside a vehicle cabin by preventing the vibration of a subframe from being transmitted to a vehicle body via a plurality of mounts, and consequently, to contribute to the development of sustainable transportation systems.

To achieve such an object, one aspect of the present invention provides a vibration damping device (11) for a vehicle (1), comprising: a subframe (13) to which a vibration of a wheel (2) is transmitted; a plurality of mounts (15) arranged between the subframe and a vehicle body (4) and configured such that stiffness of each mount in a prescribed direction changes according to an excitation current supplied thereto; and a controller (18) configured to control the excitation current supplied to each mount, wherein the controller is configured to: set a target elastic center of the subframe; and individually calculate the excitation current supplied to each mount so as to match an actual elastic center of the subframe with the target elastic center.

According to this aspect, by individually calculating the excitation current supplied to each mount, it is possible to prevent the stiffness of the plurality of mounts from increasing simultaneously and uniformly. Accordingly, it is possible to prevent the vibration of the subframe from being transmitted to the vehicle body via the plurality of mounts. Accordingly, the vibration damping performance in a vehicle cabin can be enhanced, so that the inhabitability of the vehicle can be improved. Accordingly, it is possible to contribute to the development of sustainable transportation systems. Additionally, by setting the target elastic center of the subframe and matching the actual elastic center of the subframe with the target elastic center, it is possible to freely adjust the moment generated at the subframe.

In the above aspect, preferably, the vibration damping device further comprises: a yaw rate sensor (16) configured to detect a yaw rate of the vehicle body; and a vehicle speed sensor (17) configured to detect a vehicle speed, wherein the controller is configured to: calculate a reference current value based on the yaw rate and the vehicle speed; calculate a correction coefficient of each mount based on the target elastic center; and individually calculate the excitation current supplied to each mount by correcting the reference current value based on the correction coefficient of each mount.

According to this aspect, the excitation current of appropriate magnitude can be supplied to the plurality of mounts based on the yaw rate, the vehicle speed, and the target elastic center.

In the above aspect, preferably, the plurality of mounts includes a first mount and a second mount that are arranged at an interval in a perpendicular direction perpendicular to the prescribed direction, and provided that a distance in the perpendicular direction between the target elastic center and the first mount is defined as a first distance and that a distance in the perpendicular direction between the target elastic center and the second mount is defined as a second distance, the controller is configured to: calculate the correction coefficient of the first mount by dividing the second distance by a sum of the first distance and the second distance; and calculate the correction coefficient of the second mount by dividing the first distance by the sum of the first distance and the second distance.

According to this aspect, the correction coefficient of each mount can be calculated easily and properly.

In the above aspect, preferably, the controller is configured to: store a correction coefficient table that defines the correction coefficient of each mount; and calculate the correction coefficient of each mount by referring to the correction coefficient table.

According to this aspect, the correction coefficient of each mount can be calculated easily and properly.

In the above aspect, preferably, the plurality of mounts is configured such that stiffness of each mount in an up-and-down direction changes according to the excitation current supplied thereto, the subframe has a vibration input point to which the vibration of the wheel is input, and the controller is configured to set the target elastic center so as to match a front-and-rear position of the vibration input point with a front-and-rear position of the target elastic center.

According to this aspect, it is possible to suppress the pitch moment generated at the subframe. Accordingly, it is possible to more effectively prevent the vibration of the subframe from being transmitted to the vehicle body via the plurality of mounts.

In the above aspect, preferably, the vibration damping device further comprises a vehicle speed sensor configured to detect a vehicle speed, wherein the plurality of mounts is configured such that stiffness of each mount in a lateral direction changes according to the excitation current supplied thereto, and the controller is configured to change the target elastic center in a front-and-rear direction based on the vehicle speed.

According to this aspect, the direction and magnitude of the yaw moment can be adjusted according to the vehicle speed.

Thus, according to the above aspects, it is possible to prevent the vibration of a subframe from being transmitted to a vehicle body via a plurality of mounts.

BRIEF DESCRIPTION OF THE DRAWING(S)

FIG. 8 is a functional block diagram showing a vibration damping device for a vehicle according to the second embodiment.

DETAILED DESCRIPTION OF THE INVENTION

The First Embodiment

In the following, the first embodiment of the present invention will be described with reference to FIGS. 1 to 7.
<The Vibration Damping Device 11 for a Vehicle>

Figure 1:
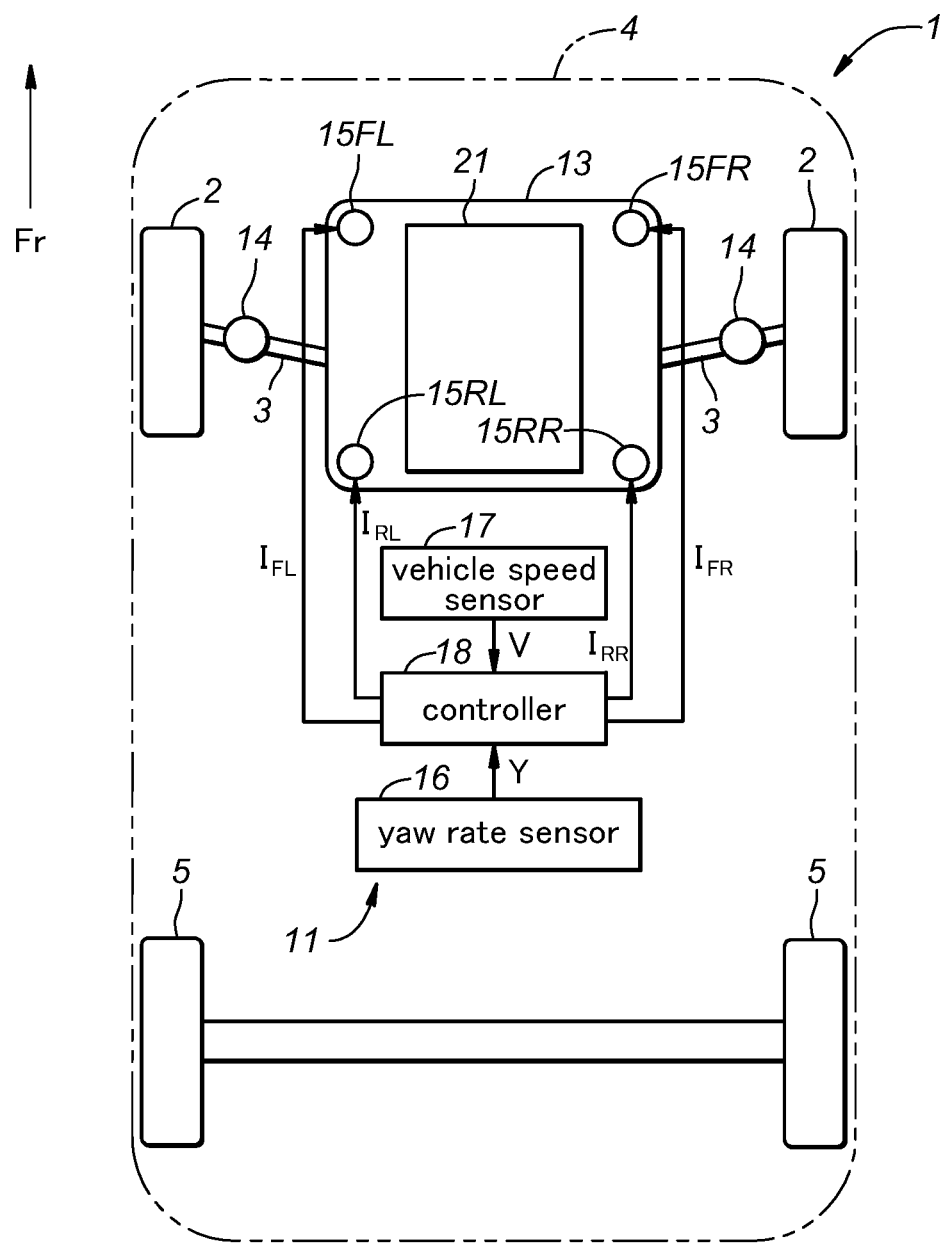
FIG. 1 is a plan view showing a vehicle to which a vibration damping device for a vehicle according to the first embodiment is applied.

FIG. 1 is a plan view showing a vehicle 1 to which a vibration damping device 11 for a vehicle (hereinafter abbreviated as "vibration damping device 11") according to the first embodiment is applied. The vibration damping device 11 includes a subframe 13 connected to left and right front wheels 2 (an example of a wheel) via left and right arms 3, left and right suspensions 14 arranged between the left and right arms 3 and a vehicle body 4 (only the outline thereof is shown in FIG. 1), four mounts 15FL, 15FR, 15RL, and 15RR arranged between the subframe 13 and the vehicle body 4, a yaw rate sensor 16 configured to detect a yaw rate Y of the vehicle 1, a vehicle speed sensor 17 configured to detect a vehicle speed V, and a controller 18 configured to control the four mounts 15FL, 15FR, 15RL, and 15RR based on the yaw rate Y and the vehicle speed V.
<The Subframe 13>

Figure 2:
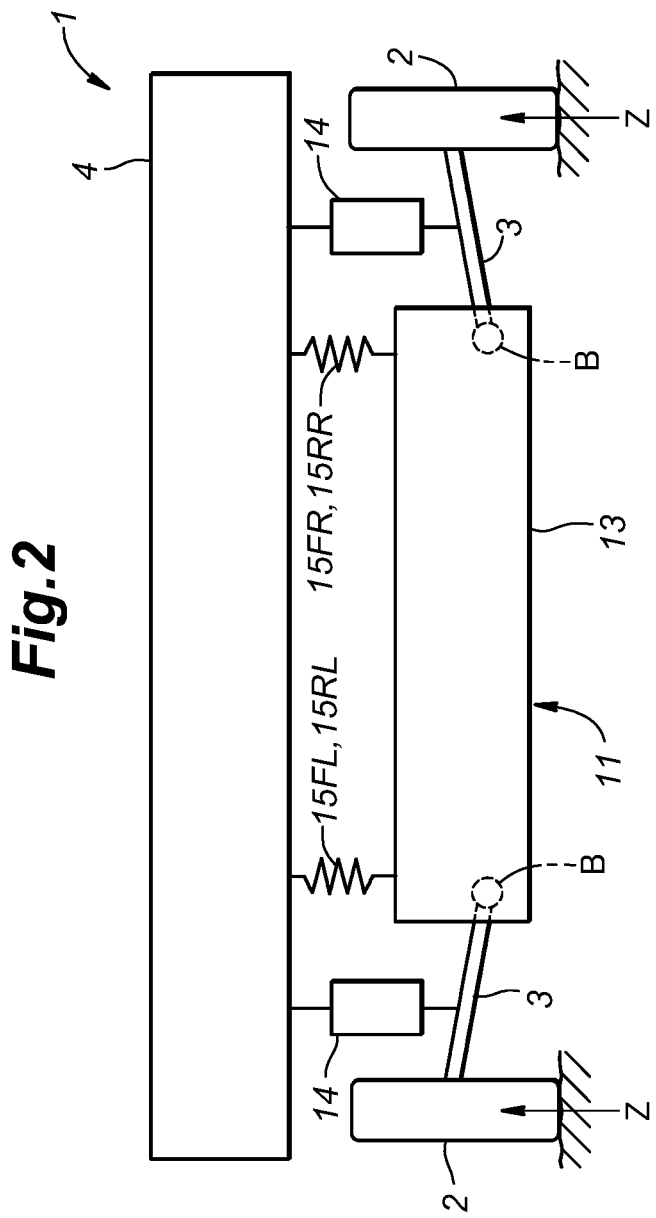
FIG. 2 is a rear view showing the vibration damping device according to the first embodiment.

With reference to FIGS. 1 and 2, the subframe 13 of the vibration damping device 11 is arranged below a front portion of the vehicle body 4. The subframe 13 has a substantially rectangular outline in a plan view. The subframe 13 supports an onboard member 21. The onboard member 21 includes, for example, a drive source such as an internal combustion engine or an electric motor for causing the vehicle 1 to travel. Additionally, the onboard member 21 may include a generator, a differential gear, a fuel tank, a transmission, and the like. The onboard member 21 is omitted in the drawings except for FIG. 1.

With reference to FIG. 2, the vibrations of the front wheels 2 based on road surface input Z are transmitted to the subframe 13 via the left and right arms 3. More specifically, the vibrations of the front wheels 2 based on the road surface input Z are input to vibration input points B of the subframe 13 via the left and right arms 3. For example, the vibration input points B of the subframe 13 are points where the subframe 13 is connected to the left and right arms 3.
<The Left and Right Suspensions 14>

The left and right suspensions 14 of the vibration damping device 11 each include a spring and a shock absorber (both are not shown). In the present embodiment, the left and right suspensions 14 are arranged between the left and right arms 3 and the vehicle body 4, respectively. In another embodiment, the left and right suspensions 14 may be arranged between the left and right front wheels 2 and the vehicle body 4, respectively. The left and right suspensions 14 are omitted in the drawings except for FIGS. 1 and 2.
<The Four Mounts 15FL, 15FR, 15RL, 15RR>

With reference to FIG. 1, the four mounts 15FL, 15FR, 15RL, and 15RR of the vibration damping device 11 are arranged at a front left corner, front right corner, rear left corner, and rear right corner of the subframe 13, respectively. The front mounts 15FL, 15FR and the rear mounts 15RL, 15RR are arranged at an interval in the front-and-rear direction. Hereinafter, the four mounts 15FL, 15FR, 15RL, and 15RR will be simply referred to as "mount(s) 15" if it is not necessary to distinguish them.

Figure 3:
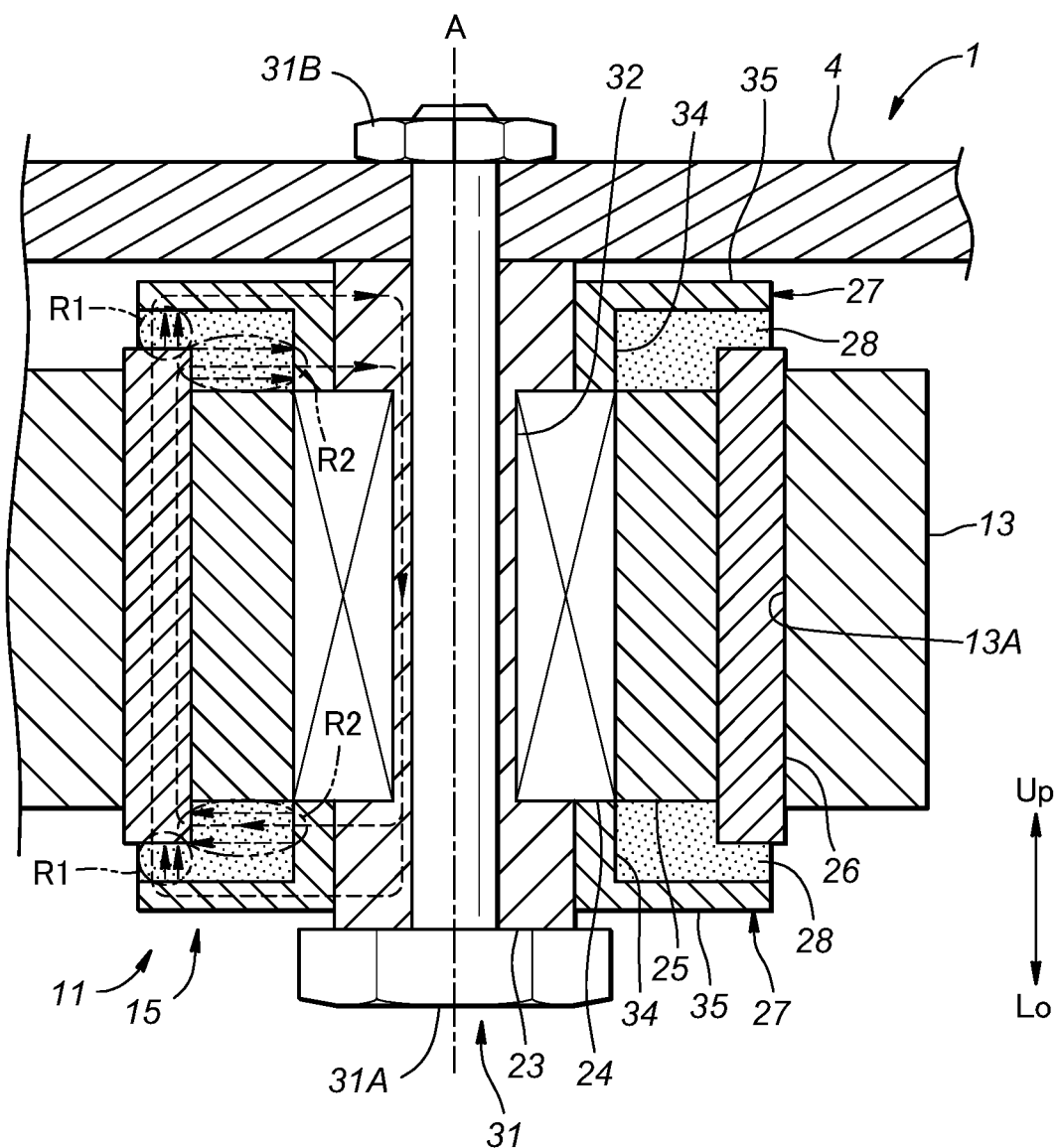
FIG. 3 is a cross-sectional view showing a mount according to the first embodiment.

With reference to FIG. 3, each mount 15 consists of a variable stiffness mount whose stiffness can be changed. The mount 15 includes an inner tube 23, an excitation coil 24, a mount rubber member 25, an outer tube 26, upper and lower cores 27, and upper and lower magnetic media 28. Hereinafter, "radially outside" and "radially inside" in the descriptions of the mount 15 indicate the outside and inside in the radial direction around an axis A extending in the up-and-down direction at the center of the mount 15.

The inner tube 23 of the mount 15 is made of a magnetic material. The inner tube 23 has a cylindrical shape around the axis A. The inner tube 23 is fixed to a lower surface of the vehicle body 4 by a fastening member 31 including a bolt 31A and a nut 31B. A recess 32 is provided on an outer circumferential surface of the inner tube 23.

The excitation coil 24 of the mount 15 has a cylindrical shape around the axis A. The excitation coil 24 is arranged radially outside the inner tube 23. A radially inside portion of the excitation coil 24 is fitted into the recess 32 of the inner tube 23.

The mount rubber member 25 of the mount 15 has a cylindrical shape around the axis A. The mount rubber member 25 is arranged radially outside the inner tube 23 and the excitation coil 24. The up-and-down length of the mount rubber member 25 matches the up-and-down length of the excitation coil 24.

The outer tube 26 of the mount 15 is made of a magnetic material. The outer tube 26 has a cylindrical shape around the axis A. The outer tube 26 is arranged radially outside the inner tube 23, the excitation coil 24, and the mount rubber member 25. The up-and-down length of the outer tube 26 is greater than the up-and-down lengths of the excitation coil 24 and the mount rubber member 25. The outer tube 26 is fitted into a fitting hole 13A provided in the subframe 13, and thus fixed to the subframe 13.

Each core 27 of the mount 15 includes a tubular portion 34 formed cylindrically around the axis A and an annular flange portion 35 extending radially outside from one vertical end (an end far from the excitation coil 24) of the tubular portion 34. The tubular portion 34 is arranged radially outside the inner tube 23. The tubular portion 34 is arranged on one vertical side of a radially outside portion of the excitation coil 24. The flange portion 35 is arranged on one vertical side of the mount rubber member 25 and the outer tube 26.

Each magnetic medium 28 of the mount 15 consists of Magnetic Rheological Elastomer (MRE). In another embodiment, the magnetic medium 28 may consist of a Magnetic Rheological Fluid (MRF) or a Magnetic Rheological Compound (MRC). The magnetic medium 28 is arranged in a space defined by the mount rubber member 25, the outer tube 26, and each core 27.

<The Yaw Rate Sensor 16>

With reference to FIG. 1, the yaw rate sensor 16 of the vibration damping device 11 is arranged near the center of gravity of the vehicle body 4, for example. The yaw rate sensor 16 detects the yaw rate Y (an angular velocity around a vertical axis) of the vehicle body 4 and outputs the detected yaw rate Y to the controller 18.

<The Vehicle Speed Sensor 17>

The vehicle speed sensor 17 of the vibration damping device 11 consists of, for example, wheel speed sensors provided in the wheels (front wheels 2 and rear wheels 5). The vehicle speed sensor 17 detects the vehicle speed V and outputs the detected vehicle speed V to the controller 18.

<The Controller 18>

The controller 18 of the vibration damping device 11 consists of an electronic control unit (ECU) that includes an arithmetic processing unit (a processor such as CPU and MPU) and a storage device (memory such as ROM and RAM). The controller 18 may consist of one piece of hardware, or may consist of a unit composed of plural pieces of hardware.

Figure 4:
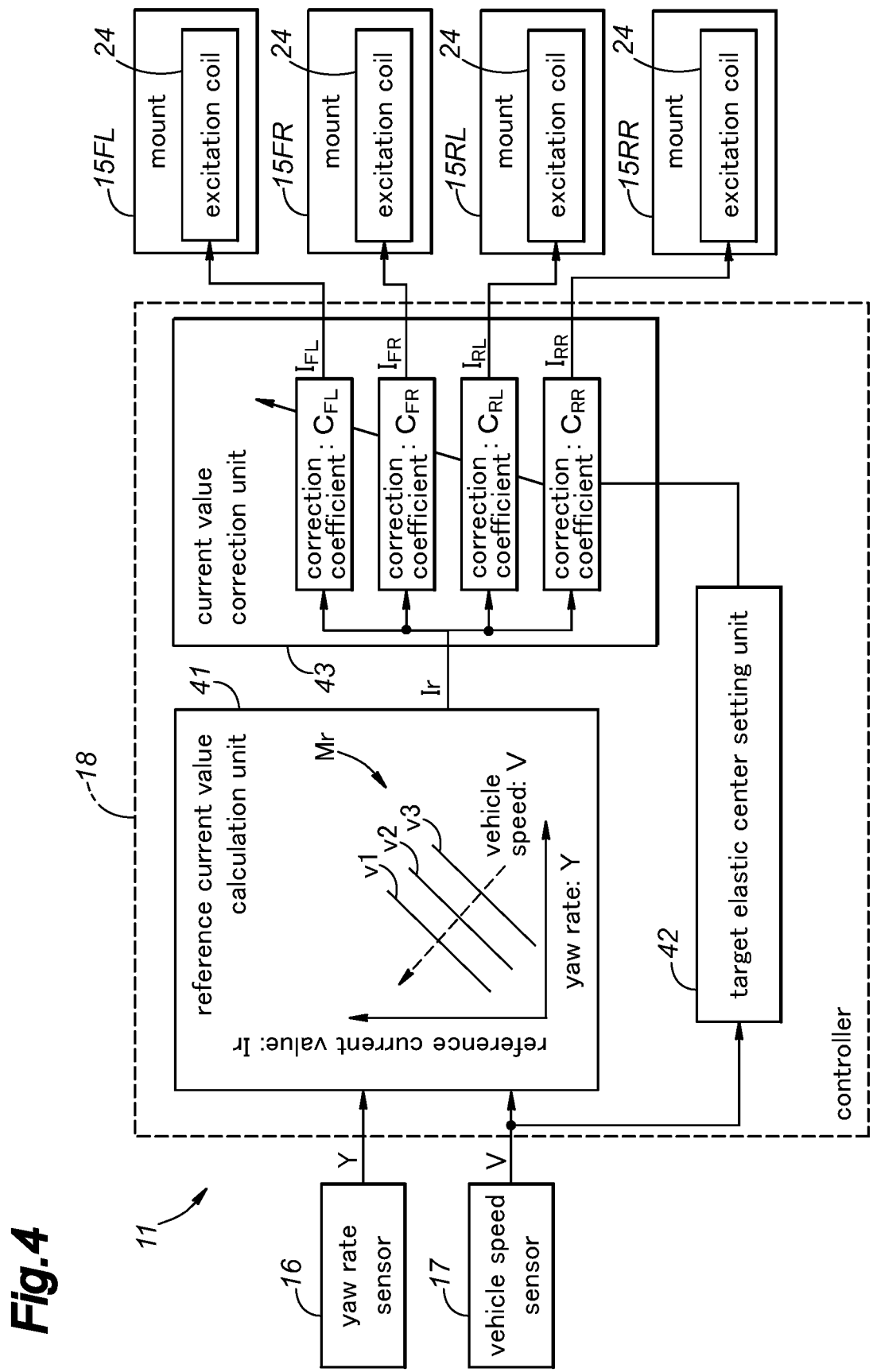
FIG. 4 is a functional block diagram showing the vibration damping device according to the first embodiment.

With reference to FIG. 4, the controller 18 is a device that controls an excitation current I of each mount 15 (an excitation current $I_{FL}$ of the mount 15FL, an excitation current $I_{FR}$ of the mount 15FR, an excitation current $I_{RL}$ of the mount 15RL, and an excitation current $I_{RR}$ of the mount 15RR). The controller 18 includes, as functional components, a reference current value calculation unit 41, a target elastic center setting unit 42, and a current value correction unit 43.

<The Reference Current Value Calculation Unit 41>

The reference current value calculation unit 41 of the controller 18 stores a reference current value map Mr. The reference current value map Mr is a map that defines a relationship between the yaw rate Y, the vehicle speed V, and a reference current value Ir. For example, straight lines v1, v2, and v3 in FIG. 4 indicate the relationship between the yaw rate Y and the reference current value Ir when the vehicle speed V is v1, v2, and v3 (v1>v2>v3), respectively. The reference current value map Mr is set such that the reference current value Ir increases as the yaw rate Y increases. The reference current value map Mr is set such that the reference current value Ir increases as the vehicle speed V increases.

The reference current value calculation unit 41 calculates the reference current value Ir by referring to the reference current value map Mr based on the yaw rate Y and the vehicle speed V. The reference current value calculation unit 41 outputs the calculated reference current value Ir to the current value correction unit 43.

<The Target Elastic Center Setting Unit 42>

The target elastic center setting unit 42 of the controller 18 sets a target elastic center Et (target rotation center) of the subframe 13. The target elastic center setting unit 42 sets a correction coefficient C of each mount 15 (a correction coefficient $C_{FL}$ of the mount 15FL, a correction coefficient $C_{FR}$ of the mount 15FR, a correction coefficient $C_{RL}$ of the mount 15RL, and a correction coefficient $C_{RR}$ of the mount 15RR) based on the set target elastic center Et. The setting method of the target elastic center Et and the calculation method of the correction coefficient C of each mount 15 will be described later. The target elastic center setting unit 42 outputs the calculated correction coefficient C of each mount 15 to the current value correction unit 43.

<The Current Value Correction Unit 43>

The current value correction unit 43 of the controller 18 individually calculates the excitation current I supplied to the excitation coil 24 of each mount 15 based on the reference current value Ir output from the reference current value calculation unit 41 and the correction coefficient C of each mount 15 output from the target elastic center setting unit 42. More specifically, the current value correction unit 43 individually calculates the excitation current I supplied to the excitation coil 24 of each mount 15 by correcting the reference current value Ir based on the correction coefficient C of each mount 15.

For example, the current value correction unit 43 calculates the excitation current $I_{FL}$ of the mount 15FL by multiplying the reference current value Ir by the correction coefficient $C_{FL}$ of the mount 15FL. Similarly, the current value correction unit 43 calculates the excitation currents $I_{FR}$, $I_{RL}$, and $I_{RR}$ of the mounts 15FR, 15RL, and 15RR by multiplying the reference current value Ir by the correction coefficients $C_{FR}$, $C_{RL}$, and $C_{RR}$ of the mounts 15FR, 15RL, and 15RR, respectively.

<The Change in Stiffness of the Mount 15>

Figure 5:
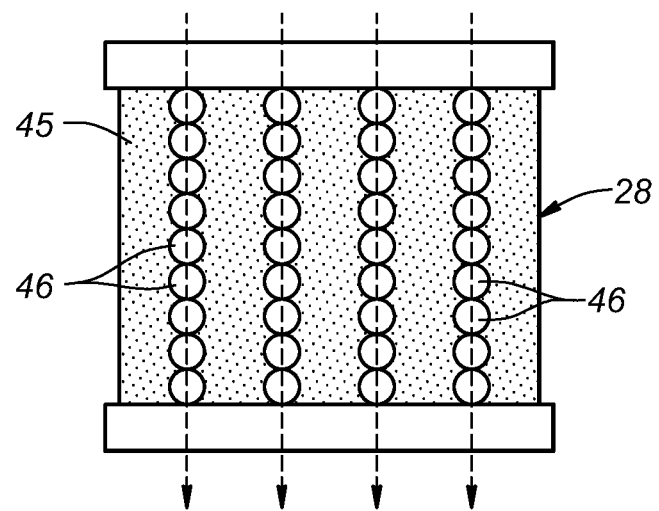
FIG. 5 is a schematic diagram showing a state where a magnetic field is applied to a magnetic medium according to the first embodiment.

With reference to FIG. 5, each magnetic medium 28 of each mount 15 is formed by mixing magnetic particles 46 (for example, iron powder) into an elastic body 45 such as silicone rubber. When a magnetic field (see broken line arrows in FIG. 5) is applied to the magnetic medium 28 from outside, the magnetic particles 46 are aligned like chains along the direction of the magnetic field, so that the movement of the elastic body 45 in a direction perpendicular to the direction of the magnetic field is prevented. Accordingly, the viscosity of the magnetic medium 28 in the direction perpendicular to the direction of the magnetic field increases, so that the stiffness of the mount 15 in the direction perpendicular to the direction of the magnetic field increases.

With reference to FIG. 3, when the excitation current I is supplied to the excitation coil 24 of each mount 15, the excitation coil 24 generates the magnetic field (see broken line arrows in FIG. 3). Accordingly, in regions R1 of FIG. 3, the magnetic field in the up-and-down direction is applied to each magnetic medium 28. Accordingly, the viscosity of the magnetic medium 28 in the horizontal direction (the front-and-rear direction and the lateral direction) increases, so that the stiffness of the mount 15 in the horizontal direction increases. Further, in regions R2 of FIG. 3, the magnetic field in the horizontal direction (more precisely, in the radial direction around the axis A) is applied to the magnetic medium 28. Accordingly, the viscosity of the magnetic medium 28 in the up-and-down direction increases, so that the stiffness of the mount 15 in the up-and-down direction increases.

<The Setting Method 1 of the Target Elastic Center Et and the Calculation Method 1 of the Correction Coefficient C of Each Mount 15>

Figure 6A:
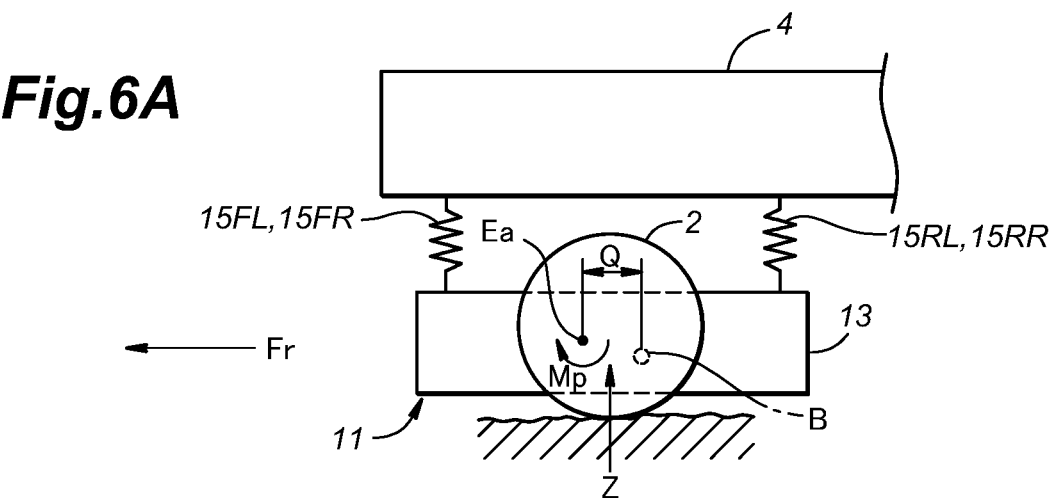
FIGS. 6A-6C are side views showing a setting method 1 of a target elastic center and a calculation method 1 of a correction coefficient of each mount according to the first embodiment.

FIG. 6A shows a state where the front-and-rear position of each vibration input point B and the front-and-rear position of an actual elastic center Ea (an actual center of rotation: hereinafter referred to as "actual elastic center Ea") of the subframe 13 are deviated from each other. In this state, when the vibrations of the front wheels 2 based on the road surface input Z are input to the subframe 13 via the vibration input point B, a pitch moment Mp corresponding to a distance Q in the front-and-rear direction between the actual elastic center Ea and the vibration input point B is generated at the subframe 13. Accordingly, the vibrations of the subframe 13 may be amplified.

Figure 6B:
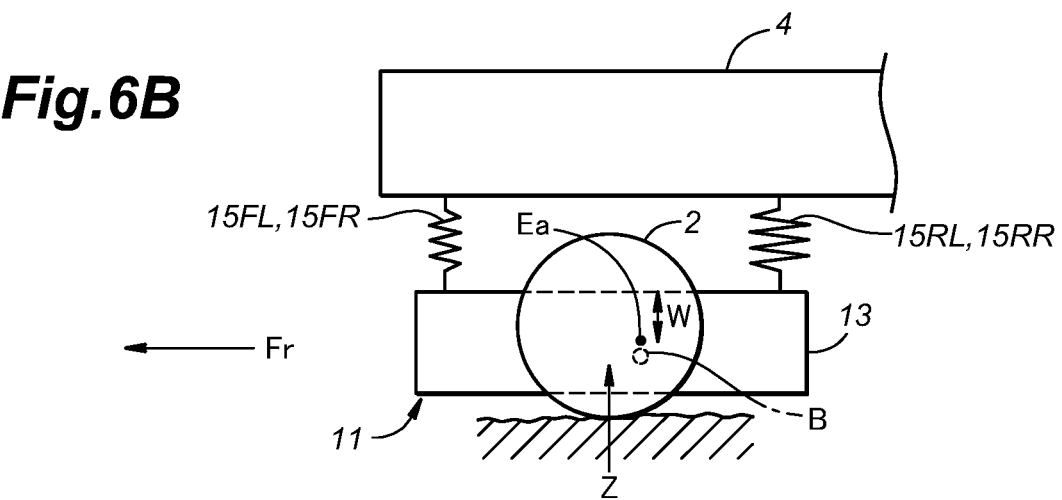

By contrast, FIG. 6B shows a state where the front-and-rear position of each vibration input point B matches the front-and-rear position of the actual elastic center Ea of the subframe 13. In this state, even if the vibrations of the front wheels 2 are input to the subframe 13 via the vibration input point B, the abovementioned pitch moment Mp is unlikely to be generated at the subframe 13, and a translational motion W (vertical motion) may be mainly generated at the subframe 13. Accordingly, it is possible to prevent the vibration of the subframe 13 from being amplified, and to enhance steering stability of the vehicle 1.

Figure 6C:
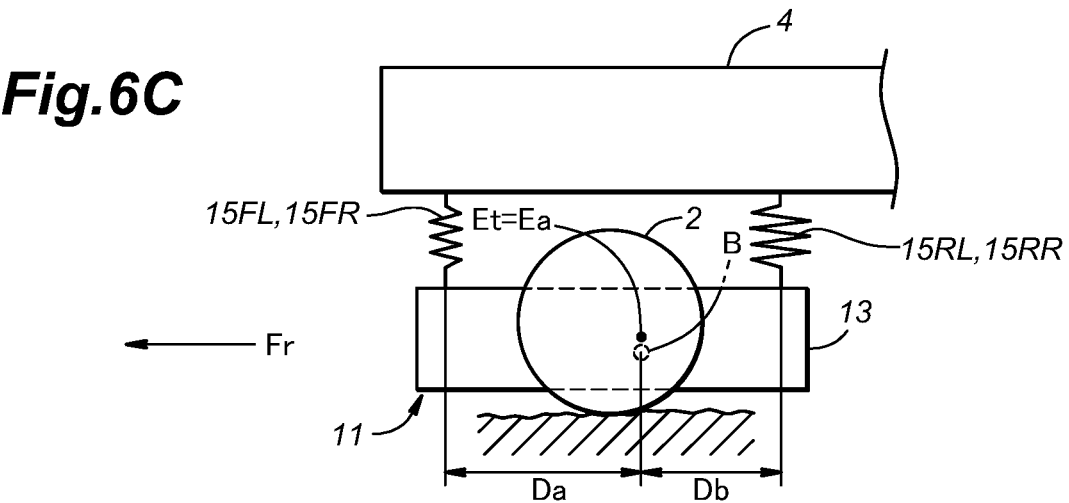

As such, as shown in FIG. 6C, the target elastic center setting unit 42 sets the target elastic center Et so as to match the front-and-rear position of the vibration input point B with the front-and-rear position of the target elastic center Et. Further, the target elastic center setting unit 42 calculates the correction coefficient C of each mount 15 based on the set target elastic center Et. For example, the target elastic center setting unit 42 calculates the correction coefficients $C_{FL}$, $C_{FR}$ of the front mounts 15FL, 15FR (the mounts on the front side: an example of the first mount) by the following formula (1), and calculates the correction coefficients $C_{RL}$, $C_{RR}$ of the rear mounts 15RL, 15RR (the mounts on the rear side: an example of the second mount) by the following formula (2). "Da" in the following formulae (1) and (2) indicates a distance (an example of a first distance: hereinafter referred to as "distance Da") in the front-and-rear direction between the target elastic center Et and the front mounts 15FL, 15FR. "Db" in the following formulae (1) and (2) indicates a distance (an example of a second distance: hereinafter referred to as "distance Db") in the front-and-rear direction between the target elastic center Et and the rear mounts 15RL, 15RR.

$$C_{FL}=C_{FR}=Db/(Da+Db) \quad (1)$$

$$C_{RL}=C_{RR}=Da/(Da+Db) \quad (2)$$

As is clear from the above formula (1), the target elastic center setting unit 42 calculates the correction coefficients $C_{FL}$, $C_{FR}$ of the front mounts 15FL, 15FR by dividing the distance Db by the sum of the distances Da and Db. Further, as is clear from the above formula (2), the target elastic center setting unit 42 calculates the correction coefficients $C_{RL}$, $C_{RR}$ of the rear mounts 15RL, 15RR by dividing the distance Da by the sum of the distances Da and Db.

For example, when the target elastic center Et is moved rearward from the position in FIG. 6C, the distance Da in the above formula (1) increases and the distance Db in the above formula (2) decreases. Accordingly, the correction coefficients $C_{FL}$, $C_{FR}$ of the front mounts 15FL, 15FR decrease, and the correction coefficients $C_{RL}$, $C_{RR}$ of the rear mounts 15RL, 15RR increase. Accordingly, the excitation currents $I_{FL}$, $I_{FR}$ of the front mounts 15FL, 15FR decrease, and the excitation currents $I_{RL}$, $I_{RR}$ of the rear mounts 15RL, 15RR increase. Accordingly, the stiffness of the front mounts 15FL, 15FR in the up-and-down direction is reduced, and the stiffness of the rear mounts 15RL, 15RR in the up-and-down direction increases. Accordingly, the actual elastic center Ea moves rearward. By contrast, when the target elastic center Et is moved forward from the position in FIG. 6C, the actual elastic center Ea moves forward due to the action opposite to the above. Thus, by determining the correction coefficient C of each mount 15 according to the above formulae (1) and (2), it is possible to match the actual elastic center Ea with the target elastic center Et.

<The Setting Method 2 of the Target Elastic Center Et and the Calculation Method 2 of the Correction Coefficient C of Each Mount 15>

Figure 7A:
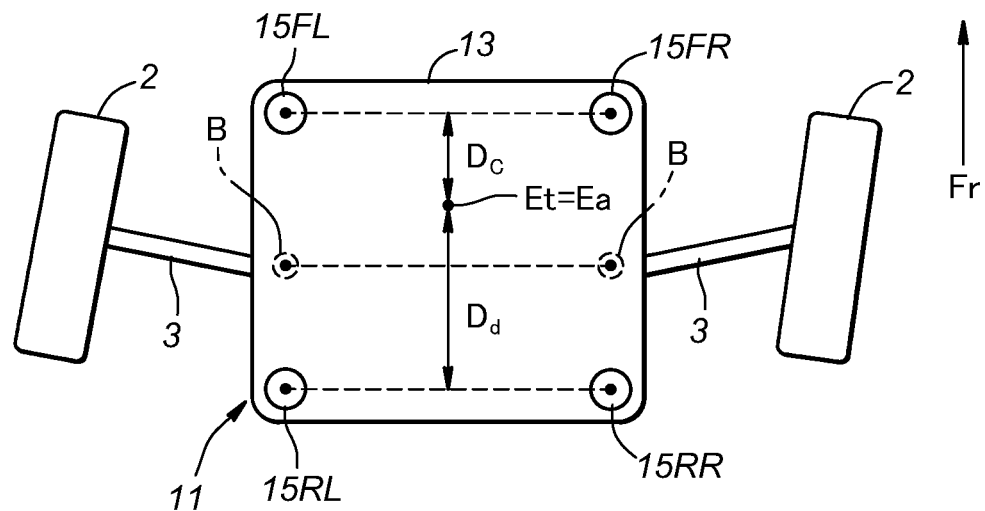
FIGS. 7A and 7B are plan views showing a setting method 2 of the target elastic center and a calculation method 2 of the correction coefficient of each mount according to the first embodiment.

As shown in FIG. 7A, in a case where the actual elastic center Ea of the subframe 13 is arranged more forward than the vibration input points B, a yaw moment in a direction that matches the turning direction of the vehicle body 4 is generated at the subframe 13 as the vehicle body 4 turns, so that the turning performance of the vehicle body 4 is improved. Accordingly, it is preferable that the actual elastic center Ea of the subframe 13 is arranged more forward than the vibration input points B so as to improve the turning performance of the vehicle body 4 when the vehicle 1 is traveling at low speed.

Figure 7B:
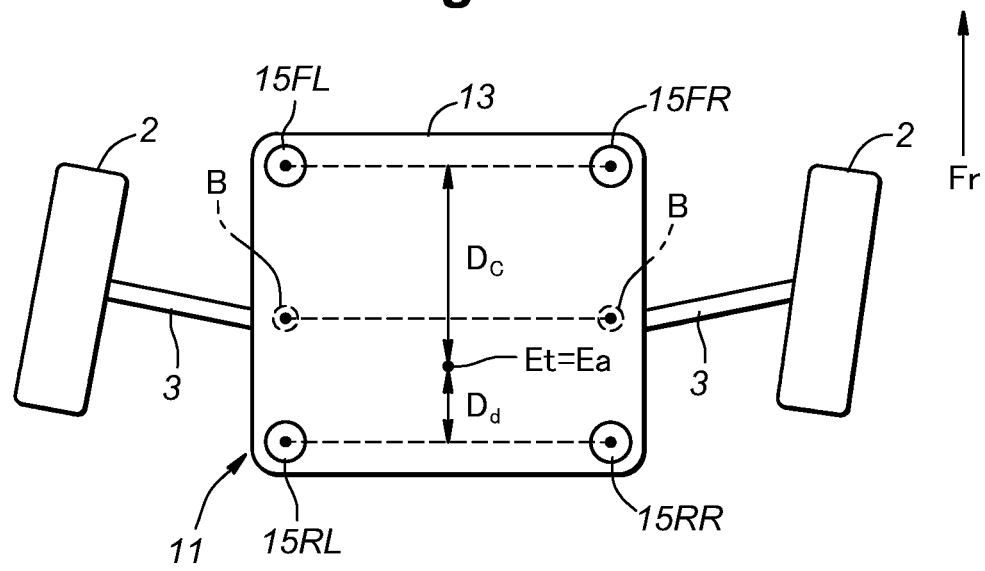

By contrast, as shown in FIG. 7B, when the actual elastic center Ea of the subframe 13 is arranged more rearward than the vibration input points B, a yaw moment in a direction opposite to the turning direction of the vehicle body 4 is generated at the subframe 13 as the vehicle body 4 turns, so that the stability of the vehicle body 4 is improved. Accordingly, it is preferable that the actual elastic center Ea of the subframe 13 is arranged more rearward than the vibration input points B so as to improve the stability of the vehicle body 4 when the vehicle 1 is traveling at high speed.

Accordingly, when the vehicle speed V output from the vehicle speed sensor 17 is equal to or more than a prescribed speed threshold (when the vehicle 1 is traveling at high speed), the target elastic center setting unit 42 sets the target elastic center Et of the subframe 13 more rearward than the vibration input point B. By contrast, when the vehicle speed V output from the vehicle speed sensor 17 is less than the speed threshold (when the vehicle 1 is traveling at low speed), the target elastic center setting unit 42 sets the target elastic center Et of the subframe 13 more forward than the vibration input point B. In another embodiment, the target elastic center setting unit 42 may set the target elastic center Et of the subframe 13 more forward than the vibration input point B when the vehicle speed V is equal to or more than the speed threshold, and set the target elastic center Et of the subframe 13 more rearward than the vibration input point B when the vehicle speed V is less than the speed threshold. In the present embodiment, the target elastic center setting unit 42 changes the target elastic center Et in the front-and-rear direction in two stages. In another embodiment, the target elastic center setting unit 42 may change the target elastic center Et in the front-and-rear direction in three or more stages.

The target elastic center setting unit 42 sets the correction coefficient C of each mount 15 based on the set target elastic center Et. For example, the target elastic center setting unit 42 calculates the correction coefficients $C_{FL}$, $C_{FR}$ of the front mounts 15FL, 15FR (an example of a first mount) by the following formula (3), and calculates the correction coefficients $C_{RL}$, $C_{RR}$ of the rear mounts 15RL, 15RR (an example of a second mount) by the following formula (4). "Dc" in the following formulae (3) and (4) indicates a distance (an example of a first distance: hereinafter referred to as "distance Dc") in the front-and-rear direction between the target elastic center Et and the front mounts 15FL, 15FR. "Dd" in the following formulae (3) and (4) indicates a distance (an example of a second distance: hereinafter referred to as "distance Dd") in the front-and-rear direction between the target elastic center Et and the rear mounts 15RL, 15RR.

$$C_{FL}=C_{FR}=Dd/(Dc+Dd) \quad (3)$$

$$C_{RL}=C_{RR}=Dc/(Dc+Dd) \quad (4)$$

As is clear from the above formula (3), the target elastic center setting unit 42 calculates the correction coefficients $C_{FL}$, $C_{FR}$ of the front mounts 15FL, 15FR by dividing the distance Dd by the sum of the distances Dc and Dd. Further, as is clear from the above formula (4), the target elastic center setting unit 42 calculates the correction coefficients $C_{RL}$, $C_{RR}$ of the rear mounts 15RL, 15RR by dividing the distance Dc by the sum of the distance Dc and the distance Dd.

With reference to FIG. 7A, when the target elastic center Et is set more forward than the vibration input points B, the distance Dd in the above formulae (3) and (4) becomes larger than the distance Dc in the above formulae (3) and (4). Accordingly, the correction coefficients $C_{FL}$, $C_{FR}$ of the front mounts 15FL, 15FR become larger than the correction coefficients $C_{RL}$, $C_{RR}$ of the rear mounts 15RL, 15RR. Accordingly, the excitation currents $I_{FL}$, $I_{FR}$ of the front mounts 15FL, 15FR become larger than the excitation currents $I_{RL}$, $I_{RR}$ of the rear mounts 15RL, 15RR. Accordingly, the stiffness of the front mounts 15FL, 15FR in the lateral direction becomes greater than the stiffness of the rear mounts 15RL, 15RR in the lateral direction. Accordingly, the actual elastic center Ea is arranged more forward than the vibration input points B. With reference to FIG. 7B, when the target elastic center Et is set more rearward than the vibration input points B, the actual elastic center Ea is arranged more rearward than the vibration input points B due to the action opposite to the above. Thus, by determining the correction coefficient C of each mount 15 according to the above formulae (3) and (4), it is possible to match the actual elastic center Ea with the target elastic center Et.

<The Setting Method 3 of the Target Elastic Center Et and the Calculation Method 3 of the Correction Coefficient C of Each Mount 15>

The target elastic center setting unit 42 sets the target elastic center Et by the same method as the setting method 1 of the target elastic center Et. Alternatively, the target elastic center setting unit 42 may set the target elastic center Et by the same method as the setting method 2 of the target elastic center Et.

The target elastic center setting unit 42 calculates the correction coefficient C of each mount 15 based on the set target elastic center Et. More specifically, the target elastic center setting unit 42 calculates a target spring ratio of the front mounts 15FL, 15FR to the rear mounts 15RL, 15RR according to the target elastic center Et by using computer simulation or the like. Further, the target elastic center setting unit 42 sets the correction coefficient C of each mount 15 based on the calculated target spring ratio.

For example, in a case where the target spring ratio of the front mounts 15FL, 15FR to the rear mounts 15RL, 15RR is 1: X, the target elastic center setting unit 42 sets the correction coefficients $C_{FL}$, $C_{FR}$ of the front mounts 15FL, 15FR by the following formula (5), and sets the correction coefficients $C_{RL}$, $C_{RR}$ of the rear mounts 15RL, 15RR by the following formula (6).

$$C_{FL}=C_{FR}=1 \quad (5)$$

$$C_{RL}=C_{RR}=X \quad (6)$$

The Effect of the First Embodiment

In the first embodiment, the controller 18 increases the reference current value Ir as the yaw rate Y increases (see the reference current value map Mr in FIG. 4). Accordingly, when the yaw rate Y increases as the vehicle 1 turns, the reference current value Ir increases, and the excitation current I supplied to each mount 15 also increases. Accordingly, the stiffness of the mount 15 is increased, so that the steering stability at turning of the vehicle 1 can be enhanced.

By the way, if the stiffness of the plurality of mounts 15 increases simultaneously and uniformly, the vibration of the subframe 13 is likely to be transmitted to the vehicle body 4 via the plurality of mounts 15. As such, the controller 18 individually calculates the excitation current I supplied to each mount 15. Accordingly, it is possible to prevent the stiffness of the plurality of mounts 15 from increasing simultaneously and uniformly. Accordingly, it is possible to prevent the vibration of the subframe 13 from being transmitted to the vehicle body 4 via the plurality of mounts 15, so that the vibration damping performance in the vehicle cabin can be enhanced.

Furthermore, the controller 18 sets the target elastic center Et of the subframe 13, and matches the actual elastic center Ea of the subframe 13 with the target elastic center Et. Accordingly, the moment (for example, the pitch moment and the yaw moment) generated at the subframe 13 can be freely adjusted.

The Second Embodiment

Next, the second embodiment of the present invention will be described with reference to FIGS. 8 and 9. Explanations that overlap with those of the first embodiment of the present invention will be omitted as appropriate.

<The Vibration Damping Device 51 for a Vehicle>

FIG. 8 is a functional block diagram showing a vibration damping device 51 for a vehicle (hereinafter abbreviated as "vibration damping device 51") according to the second embodiment. In the vibration damping device 51, the components other than four mounts 53FL, 53FR, 53RL, and 53RR and a controller 54 are the same as those of the first embodiment. Accordingly, descriptions of these components will be omitted.

<The Four Mounts 53FL, 53FR, 53RL, and 53RR>

Like the four mounts 15FL, 15FR, 15RL, and 15RR of the first embodiment, the four mounts 53FL, 53FR, 53RL, and 53RR of the vibration damping device 51 are arranged at a front left corner, front right corner, rear left corner, and rear right corner of the subframe 13, respectively. Hereinafter, the four mounts 53FL, 53FR, 53RL, and 53RR will be simply referred to as "mount(s) 53" if it is not necessary to distinguish them.

Each mount 53 has three excitation coils 56X, 56Y, and 56Z. When a current is supplied to the excitation coil 56X, the excitation coil 56X generates a magnetic field in a direction perpendicular to the X-axis direction (front-and-rear direction), thereby increasing the stiffness of the mount 53 in the X-axis direction. When a current is supplied to the excitation coil 56Y, the excitation coil 56Y generates a magnetic field in a direction perpendicular to the Y-axis direction (lateral direction), thereby increasing the stiffness of the mount 53 in the Y-axis direction. When a current is supplied to the excitation coil 56Z, the excitation coil 56Z generates a magnetic field in a direction perpendicular to the Z-axis direction (up-and-down direction), thereby increasing the stiffness of the mount 53 in the Z-axis direction. Thus, the mount 53 is configured to independently change the stiffness in the three axial directions.

<The Controller 54>

The controller 54 includes, as functional components, a reference current value calculation unit 58, a target elastic center setting unit 59, and a current value correction unit 60. The configuration of the reference current value calculation unit 58 is the same as that of the reference current value calculation unit 41 according to the first embodiment. Accordingly, the description thereof will be omitted.

<The Target Elastic Center Setting Unit 59>

Figure 9:
FIG. 9 shows a correction coefficient table according to the second embodiment.

With reference to FIG. 9, the target elastic center setting unit 59 of the controller 54 stores a correction coefficient table T. The correction coefficient table T defines a correction coefficient C of each mount 53 in each axial direction according to the vehicle speed V. For example, the correction coefficient table T defines a correction coefficient $C_{FLX}$ of the mount 53FL in the X-axis direction, a correction coefficient $C_{FLY}$ of the mount 53FL in the Y-axis direction, and a correction coefficient $C_{FLZ}$ of the mount 53FL in the Z-axis direction. Similarly, the correction coefficient table T defines the correction coefficients C of the mounts 53FR, 53RL, and 53RR in the X-axis, Y-axis, and Z-axis directions, respectively.

The target elastic center setting unit 59 calculates the correction coefficient C of each mount 53 in each axial direction by referring to the correction coefficient table T based on the vehicle speed V output from the vehicle speed sensor 17. The target elastic center setting unit 59 outputs the set correction coefficient C of the mount 53 in each axial direction to the current value correction unit 60.

<The Current Value Correction Unit 60>

The current value correction unit 60 of the controller 54 individually calculates the excitation current I of each mount 53 in each axial direction by correcting the reference current value Ir based on the correction coefficient C of the mount 53 in each axial direction. For example, the current value correction unit 60 calculates the excitation currents $I_{FLX}$, $I_{FLY}$, and $I_{FLZ}$ of the mount 53FL in each axial direction by multiplying the reference current value Ir by the correction coefficients $C_{FLX}$, $C_{FLY}$, and $C_{FLZ}$. The current value correction unit 60 outputs the calculated excitation current I of the mount 53 in each axial direction to the excitation coils 56X, 56Y, and 56Z of the mount 53. Accordingly, the stiffness of the mount 53 in each axial direction changes independently.

The Effect of the Second Embodiment

As described above, in the second embodiment, the controller 54 independently changes the stiffness of each mount 53 in each axial direction. Accordingly, the pitch moment, roll moment, and yaw moment generated at the subframe 13 can be suppressed at the same time. Accordingly, the current required to ensure the steering stability can be reduced, and the increase in the vibration and noise can be suppressed.

Further, the correction coefficient table T defines the correction coefficient C of each mount 53 in each axial direction according to the vehicle speed V. Thus, the correction coefficient C of the mount 53 in each axial direction according to the vehicle speed V can be set easily.

The Modification of the Second Embodiment

In the second embodiment, each mount 53 is configured to independently change the stiffness thereof in the three axial directions. In a case where the stiffness of the mount 53 in the three axial directions are dependent on each other (refer to the first embodiment), the controller 54 may predetermine the priorities of the three axes, and output the excitation current I such that the stiffness of the mount 53 in the axial direction with the highest priority matches the target value.

Concrete embodiments of the present invention have been described in the foregoing, but the present invention should not be limited by the foregoing embodiments and various modifications and alterations are possible within the scope of the present invention.

The invention claimed is:

1. A vibration damping device for a vehicle, comprising:
a subframe to which a vibration of a wheel is transmitted;
a plurality of mounts arranged between the subframe and a vehicle body and configured such that stiffness of each mount in a prescribed direction changes according to an excitation current supplied thereto; and
a controller configured to control the excitation current supplied to each mount,
wherein the controller is configured to:
set a target elastic center of the subframe; and
individually calculate the excitation current supplied to each mount so as to match an actual elastic center of the subframe with the target elastic center.

2. The vibration damping device according to claim 1, further comprising:
a yaw rate sensor configured to detect a yaw rate of the vehicle body; and
a vehicle speed sensor configured to detect a vehicle speed,
wherein the controller is configured to:
calculate a reference current value based on the yaw rate and the vehicle speed;
calculate a correction coefficient of each mount based on the target elastic center; and
individually calculate the excitation current supplied to each mount by correcting the reference current value based on the correction coefficient of each mount.

3. The vibration damping device according to claim 2, wherein the plurality of mounts includes a first mount and a second mount that are arranged at an interval in a perpendicular direction perpendicular to the prescribed direction, and
provided that a distance in the perpendicular direction between the target elastic center and the first mount is defined as a first distance and that a distance in the perpendicular direction between the target elastic center and the second mount is defined as a second distance, the controller is configured to:
calculate the correction coefficient of the first mount by dividing the second distance by a sum of the first distance and the second distance; and
calculate the correction coefficient of the second mount by dividing the first distance by the sum of the first distance and the second distance.

4. The vibration damping device according to claim 2, wherein the controller is configured to:

store a correction coefficient table that defines the correction coefficient of each mount; and calculate the correction coefficient of each mount by referring to the correction coefficient table.

5. The vibration damping device according to claim 1, wherein the plurality of mounts is configured such that stiffness of each mount in an up-and-down direction changes according to the excitation current supplied thereto, the subframe has a vibration input point to which the vibration of the wheel is input, and the controller is configured to set the target elastic center so as to match a front-and-rear position of the vibration input point with a front-and-rear position of the target elastic center.

6. The vibration damping device according to claim 1, further comprising a vehicle speed sensor configured to detect a vehicle speed, wherein the plurality of mounts is configured such that stiffness of each mount in a lateral direction changes according to the excitation current supplied thereto, and the controller is configured to change the target elastic center in a front-and-rear direction based on the vehicle speed.

* * * * *